Jan. 29, 1946. E. R. BOYNTON ET AL 2,393,585

POWER BOOST

Filed Dec. 14, 1944

Inventors:
Erwin R. Boynton,
Howard W. Avery,
by Harry E. Dunham
Their Attorney.

Patented Jan. 29, 1946

2,393,585

UNITED STATES PATENT OFFICE 2,393,585

POWER BOOST

Erwin R. Boynton and Howard W. Avery, Schenectady, N. Y., assignors to General Electric Company, a corporation of New York Application December 14, 1944, Serial No. 568,162

5 Claims. (Cl. 121—41)

The present invention relates to power boosts for augmenting or amplifying a force or control signal applied manually or otherwise to a control member to be accurately positioned. Such power boosts may be used, for example, to operate control surfaces, ailerons, rudders and elevators of large aircraft in order to preclude excessive strain and fatigue of the pilot. It is mostly desirable in these cases to provide a hydraulic servo motor type booster which includes means for giving the pilot an accurate feel of the forces applied to the surfaces to be controlled. For example, when a force of 100 lbs. has to be applied to move the ailerons on a plane it may be desirable that the pilot have a feel of 40 lbs.; in other words, that he apply to a control stick or steering wheel a force of 40 lbs. in order to produce a force of 100 lbs. at the aileron. With such an arrangement the pilot feels at all times the forces applied to the elements to be controlled or, from another viewpoint, he feels the resistance to be overcome to effect movement of certain elements and thereby can readily avoid the application of excessive forces to the ailerons or other controlled elements. In addition with an accurate feel the pilot knows how close a plane is to stalling.

The object of our invention is to provide an improved construction and arrangement of power boosts of the type above specified, simple in construction, reliable in operation and comparatively cheap in manufacture which provides positive and accurate control of position together with an accurate feel.

For a consideration of what we believe to be novel in our invention, attention is directed to the following description and the claims appended thereto in connection with the accompanying drawing.

Figure 1:
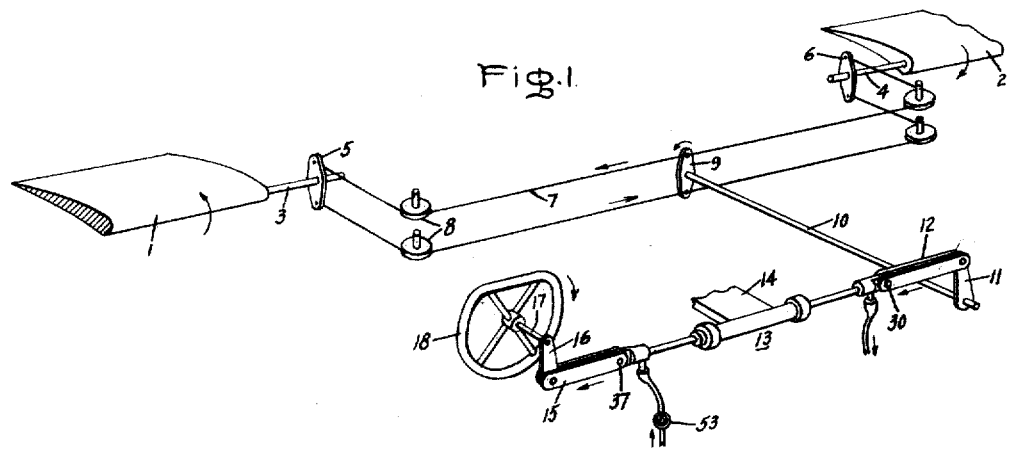
Figure 2:
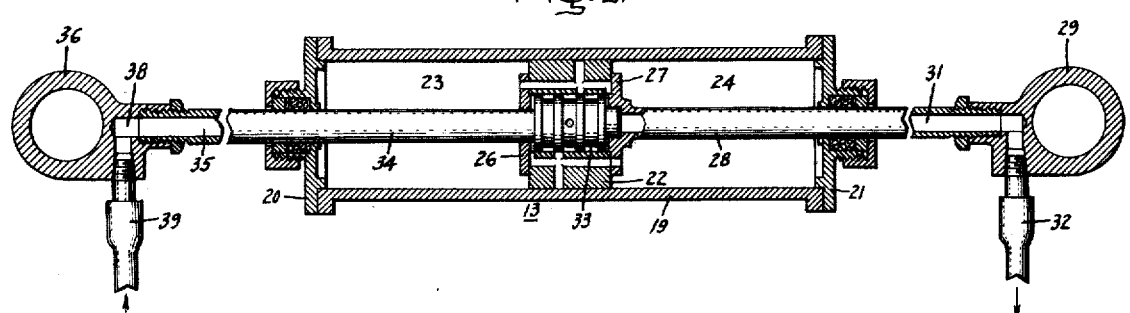
Figure 3:
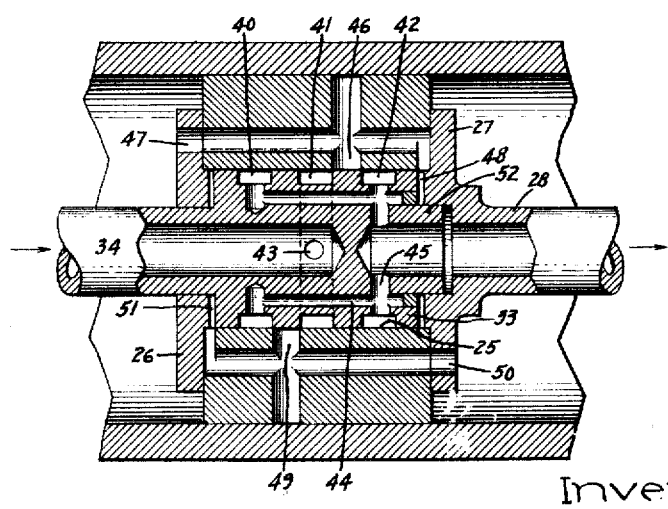

In the drawing, Fig. 1 illustrates an airplane control arrangement including a booster embodying our invention; Fig. 2 is a sectional view of the booster used in the arrangement of Fig. 1; and Fig. 3 is an enlarged view of certain parts of Fig. 2 in section.

The control arrangement shown in Fig. 1 includes two ailerons 1, 2 forming parts of wing surfaces of a plane. The ailerons are moved in opposite directions, that is, one is moved downward and the other upward. To this end shafts 3 and 4 are rigidly secured to the ailerons. Levers 5 and 6 are secured to the shafts 3 and 4 respectively. The outer ends of the levers are connected by a wire or rope 7, which latter is guided on a plurality of pulleys 8. Portions of the wire 7 are connected to the outer end of a lever 9 which has an intermediate portion secured to a shaft 10. The latter is connected by a lever or arm 11 and a link 12 to one end of a booster 13 securely held on a support 14. The other end of the booster is connected by a link 15 to the end of another lever or arm 16. The latter is secured to a shaft 17 which may be turned by means of a stick or steering wheel 18. Upon rotation of the steering wheel 18 in one direction the ailerons 1 and 2 are turned in the directions indicated by arrows and upon rotation of the steering wheel in opposite direction the ailerons are turned in directions opposite those indicated by the arrows.

As pointed out above, the booster constitutes a means for amplifying or augmenting the force applied to the controlling element, in the present instance the steering wheel 18. As shown more in detail in Figs. 2 and 3, the booster comprises a hydraulic servo motor which has a cylinder 19 with end plates 20 and 21. A piston 22 is movably disposed in the cylinder and forms pressure chambers 23 and 24 therewith. The piston has a cylindrical bore 25 and end plates 26 and 27. The end plate 27 in the present example is integrally formed with a stem 28 for the piston. The right-hand end of the piston 28 is secured to an eye member 29, which latter is held on the link 12 by a pivot 30. The stem 28 has a bore or channel 31 which communicates at its right-hand end through a channel in the eye member 29 with a flexible conduit or hose 32. A valve member 33 is slidably disposed within the bore 25 of the piston. Relative axial movement between the valve member 33 and the piston is limited by the end plates 26, 27 of the latter. The valve member 33 is connected to a stem 34 which has sliding fit in the end plate 26 of the piston and the end plate 20 of the cylinder. The stem 34 is of the same diameter as the piston stem 28 and has a bore or channel 35. The left-hand end of the valve stem 34 is secured to an eye member 36 connected by a pivot 37 to the link 15 and having a channel 38 for effecting communication between the channel 35 and a flexible conduit or hose 39 secured to the eye member 36. The valve member has three axially spaced, circumferential grooves 40, 41 and 42 defining two spaced valve heads between them. The groove 41 forms part of a supply channel for fluid under pressure, whereas the grooves 40, 42 form parts of a discharge or drain channel. The groove 41 is connected by radial bores 43 to the supply channel 35 in the valve stem. The grooves 40, 42 are interconnected by axial channels 44 in the valve member which channels 44 communicate through radial channels 45 in the valve member with the drain channel 31 in the piston stem. Operating fluid may be conducted from the supply channel 41 to the pressure chamber 23 through a radial port 46 and an axial channel 47 in the piston. The axial channel 47 extends through the left-hand end plate 26 and at its right-hand end the channel 47 communicates with the space 48 between the end plate 27 and the valve member.

Fluid may be conducted from the supply channel 41 to the pressure chamber 24 on the right-hand side of the piston through a radial port 49 and an axial channel 50 in the piston. The channel 50 extends through the right hand end plate 47 of the piston and at its left-hand end the channel 50 extends through the right-hand end plate between the left-hand end plate 26 of the piston and the adjacent end face of the valve. The inner and outer diameters of the clearance spaces 48 and 51 are alike. In order to accomplish this the right-hand end of the valve member has an extension 52 slidably disposed in a recess of the end plate 27 and of a diameter equal to the outer diameter of the stem 34.

During operation the flexible conduit 39 is connected to a source of oil or like operating medium under pressure (not shown) and the flexible conduit 32 is connected to a suitable reservoir (not shown) for receiving fluid discharged from the booster. The pressure chambers 23, 24 of the servo motor are normally completely filled with operating medium, also the various channels, except the drain channel 31 in the piston stem. The booster is shown in neutral position in which the heads of the valve member 33 cover the axially spaced ports 46 and 49 of the piston. In other words, the valve heads formed between the grooves 40, 41 and 42 are in line-in-line position with the ports 46 and 49 respectively. Upon movement of the valve stem 34 toward the left the ports 46 and 49 are uncovered. Fluid under pressure in this case is conducted from the supply groove 41 through the port 49 and the channel 50 into the right-hand pressure chamber 24. At the same time fluid is discharged from the pressure chamber 23 through the channel 47 and the port 46 into the drain groove 42, whence the fluid flows through the radial channels 45 into the discharge channel 31 of the piston stem. The supply of fluid under pressure to the chamber 24 and the simultaneous discharge of fluid from the chamber 23 causes the piston to move toward the left, that is, to follow the movement of the valve member. This movement continues until the piston has reached a position in which the ports 46 and 49 are again covered by the valve heads of the valve member and further flow of fluid through the channels is precluded.

In the aforementioned example fluid under pressure was supplied through the channel 50 to the pressure chamber 24. During such condition fluid under pressure is also supplied through the channel 50 to the left-hand end of the valve member, that is, the clearance space 51 or rather the space 51 is maintained in communication with the supply port for fluid under pressure. At the same time fluid is being discharged from the right-hand end of the valve member, that is, the clearance space 48. This creates an axial pressure drop across the valve, thus producing a force which must be overcome to move the valve member toward the left. This force constitutes the feel or feel-back which the pilot senses as he operates the boost or booster. This force is transmitted through the piston and the stem 28 to the element to be controlled. In a particular arrangement such force may be of the order of 40% of the total force. Thus, if the total force necessary to operate the ailerons is 100 lbs. it is necessary for the pilot to apply a force of 40 lbs. only to the valve stem 34. The additional force of 60 lbs. is produced by the action of the servo motor. Thus, during operation the operator of the power boost senses a force in overcoming the resistance to movement of the valve which bears a definite relation to the output of the boost, that is, the resistance to movement of the piston.

Upon movement of the valve stem 34 to the right, fluid under pressure is supplied from the annular supply channel 41 to the left-hand pressure chamber 23 and simultaneously to the right-hand clearance space 48. At the same time fluid is discharged from the right-hand pressure chamber 24 through the channel 50 to the port 49 and the discharge channels 40, 44, 45 to the drain channel 31, and also from the left-hand clearance space 51 resulting in movement of the piston to the right.

Thus with our invention we have provided an improved power boost which broadly comprises a servo motor having a cylinder and piston slidably disposed therein and connected to a hollow stem projecting through one end of the cylinder together with a valve movably disposed within a cylindrical chamber formed centrally in the piston and projecting through the other end of the cylinder. The stems of the piston and the valve are hollow, forming channels which constitute parts of fluid flow passages for supplying operating fluid to the pressure chambers formed on opposite sides of the piston and discharging fluid therefrom. The valve member has axially spaced dams controlling two axially spaced ports in the piston communicating with the respective pressure chambers. The end faces of the valve form clearance spaces with the adjacent faces or end plates of the piston chamber, which clearance spaces are connected to the respective ports so that upon the supply of operating medium to one pressure chamber the clearance space on the opposite side of the piston is simultaneously connected to the fluid supply and the other clearance space is connected to the drain. The two piston stems are of like diameters and likewise the annular clearance spaces have like inner and outer dimensions so that the feel and the boost or power amplification are the same for both directions of movement of the piston.

The arrangement, more particularly the power boost, may be operated as an ordinary link by disconnecting the supply of fluid under pressure. To this end the supply line 39 is provided with a valve 53. Upon closing of the valve 53 the piston of the hydraulic motor is moved upon movement of the valve by mechanical engagement between them. More specifically, upon movement of the valve toward the left, operating fluid is drained from the left-hand pressure chamber 23 through the valve and the drain channel 31. Similarly, upon movement of the valve toward the right, fluid is drained from the right-hand pressure chamber 24. As no fluid is supplied to the pressure chambers the servo motor is rendered inoperative, that is, the input or controlling force applied to the valve stem is not boosted or augmented. Thus the output force of the boost is equal to the input force applied to the valve stem. The power boost simply acts as a link with a slight lost motion connection due to the axial clearance between the valve member and the cylindrical chamber in the piston.

Having described the method of operation of our invention, together with the apparatus which we now consider to represent the best embodiment thereof, we desire to have it understood that the apparatus shown is only illustrative and that the invention may be carried out by other means.

What we claim as new and desire to secure by Letters Patent of the United States is:

1. Power boost comprising a cylinder, a piston movably disposed in the cylinder and forming pressure chambers therewith, a hollow fluid-conducting stem connected to the piston and projecting through one end of the cylinder, means for controlling the displacement of fluid in said chambers to effect movement of the piston including a central bore in the piston with axially spaced ports each connected to one of the chambers, a valve member having valve heads for controlling said ports being slidably disposed in said central bore, and a hollow fluid-conducting stem connected to the valve member and projecting through the other end of the cylinder, the piston having end plates forming annular spaces with the valve member therein and channels in the piston connecting each of said spaces with one of the ports and one of the chambers.

2. Power boost comprising a cylinder, a piston slidable in the cylinder and forming pressure chambers therewith, the piston having a cylindrical chamber and axially spaced ports each connected to one of the pressure chambers, a valve for controlling the displacement of operating fluid in the chambers having a valve member disposed in the cylindrical chamber with valve heads associated with said ports and end faces forming annular spaces with the adjacent ends of the cylindrical chamber, and channels connecting each of said spaces to one of said ports to produce a resistance to movement of the valve bearing a definite relation to the force resisting movement of the piston.

3. Power boost comprising a cylinder, a piston slidable in the cylinder and forming pressure chambers therewith, the piston having a cylindrical chamber and axially spaced ports each connected to one of the pressure chambers, a valve for controlling the displacement of operating fluid in the chambers having a valve member disposed in the cylindrical chamber with valve heads associated with said ports and end faces forming annular spaces with the adjacent ends of the cylindrical chamber and channels connecting each of said spaces to one of said ports to produce a resistance to movement of the valve bearing a definite relation to the force resisting movement of the piston, and conduit means for conducting fluid to the cylinder including a stem for the valve with a central bore.

4. Power boost comprising a cylinder, a piston slidable in the cylinder and forming pressure chambers therewith, the piston having a cylindrical chamber and axially spaced ports each connected to one of the pressure chambers, a valve for controlling the displacement of operating fluid in the chambers having a valve member disposed in the cylindrical chamber with valve heads associated with said ports and end faces forming annular spaces with the adjacent ends of the cylindrical chamber, channels connecting each of said spaces to one of said ports to produce a resistance to movement of the valve bearing a definite relation to the output force of the power boost, conduit means for conducting fluid to the cylinder including a stem for the valve with a central bore, and other conduit means for discharging fluid from the cylinders including a stem for the piston with a central bore forming a drain channel, said stems having like outer diameters.

5. Power boost comprising a cylinder, a piston movably disposed therein and forming pressure chambers on opposite sides thereof, the piston having a central cylindrical chamber with axially spaced ports each connected to a pressure chamber, a valve for controlling the displacement of fluid in the chambers comprising a valve member disposed in the cylindrical chamber and having axially spaced heads associated with the ports, a supply groove formed between the heads, means for conducting operating fluid under pressure to the chambers including a hollow stem for the pilot valve and said supply groove, means for discharging fluid from the cylinder including a hollow stem for the piston and annular grooves in the valve member, and means for sensing the resistance to movement of the piston comprising annular spaces between the end faces of the valve member and the cylindrical chamber and channels in the piston connecting each of said spaces to one of said ports.

ERWIN R. BOYNTON.
HOWARD W. AVERY.

Certificate of Correction

Patent No. 2,393,585. January 29, 1946.

ERWIN R. BOYNTON ET AL.

It is hereby certified that error appears in the printed specification of the above numbered patent requiring correction as follows: Page 2, first column, line 18, strike out the words "extends through the right-hand end plate" and insert instead *communicates with the annular space 51*; and that the said Letters Patent should be read with this correction therein that the same may conform to the record of the case in the Patent Office.

Signed and sealed this 23rd day of July, A. D. 1946.

[SEAL]

LESLIE FRAZER,
*First Assistant Commissioner of Patents.* force applied to the valve stem. The power boost simply acts as a link with a slight lost motion connection due to the axial clearance between the valve member and the cylindrical chamber in the piston.

Having described the method of operation of our invention, together with the apparatus which we now consider to represent the best embodiment thereof, we desire to have it understood that the apparatus shown is only illustrative and that the invention may be carried out by other means.

What we claim as new and desire to secure by Letters Patent of the United States is:

1. Power boost comprising a cylinder, a piston movably disposed in the cylinder and forming pressure chambers therewith, a hollow fluid-conducting stem connected to the piston and projecting through one end of the cylinder, means for controlling the displacement of fluid in said chambers to effect movement of the piston including a central bore in the piston with axially spaced ports each connected to one of the chambers, a valve member having valve heads for controlling said ports being slidably disposed in said central bore, and a hollow fluid-conducting stem connected to the valve member and projecting through the other end of the cylinder, the piston having end plates forming annular spaces with the valve member therein and channels in the piston connecting each of said spaces with one of the ports and one of the chambers.

2. Power boost comprising a cylinder, a piston slidable in the cylinder and forming pressure chambers therewith, the piston having a cylindrical chamber and axially spaced ports each connected to one of the pressure chambers, a valve for controlling the displacement of operating fluid in the chambers having a valve member disposed in the cylindrical chamber with valve heads associated with said ports and end faces forming annular spaces with the adjacent ends of the cylindrical chamber, and channels connecting each of said spaces to one of said ports to produce a resistance to movement of the valve bearing a definite relation to the force resisting movement of the piston.

3. Power boost comprising a cylinder, a piston slidable in the cylinder and forming pressure chambers therewith, the piston having a cylindrical chamber and axially spaced ports each connected to one of the pressure chambers, a valve for controlling the displacement of operating fluid in the chambers having a valve member disposed in the cylindrical chamber with valve heads associated with said ports and end faces forming annular spaces with the adjacent ends of the cylindrical chamber and channels connecting each of said spaces to one of said ports to produce a resistance to movement of the valve bearing a definite relation to the force resisting movement of the piston, and conduit means for conducting fluid to the cylinder including a stem for the valve with a central bore.

4. Power boost comprising a cylinder, a piston slidable in the cylinder and forming pressure chambers therewith, the piston having a cylindrical chamber and axially spaced ports each connected to one of the pressure chambers, a valve for controlling the displacement of operating fluid in the chambers having a valve member disposed in the cylindrical chamber with valve heads associated with said ports and end faces forming annular spaces with the adjacent ends of the cylindrical chamber, channels connecting each of said spaces to one of said ports to produce a resistance to movement of the valve bearing a definite relation to the output force of the power boost, conduit means for conducting fluid to the cylinder including a stem for the valve with a central bore, and other conduit means for discharging fluid from the cylinders including a stem for the piston with a central bore forming a drain channel, said stems having like outer diameters.

5. Power boost comprising a cylinder, a piston movably disposed therein and forming pressure chambers on opposite sides thereof, the piston having a central cylindrical chamber with axially spaced ports each connected to a pressure chamber, a valve for controlling the displacement of fluid in the chambers comprising a valve member disposed in the cylindrical chamber and having axially spaced heads associated with the ports, a supply groove formed between the heads, means for conducting operating fluid under pressure to the chambers including a hollow stem for the pilot valve and said supply groove, means for discharging fluid from the cylinder including a hollow stem for the piston and annular grooves in the valve member, and means for sensing the resistance to movement of the piston comprising annular spaces between the end faces of the valve member and the cylindrical chamber and channels in the piston connecting each of said spaces to one of said ports.

ERWIN R. BOYNTON.
HOWARD W. AVERY.

Certificate of Correction

Patent No. 2,393,585.     January 29, 1946.

ERWIN R. BOYNTON ET AL.

It is hereby certified that error appears in the printed specification of the above numbered patent requiring correction as follows: Page 2, first column, line 18, strike out the words "extends through the right-hand end plate" and insert instead *communicates with the annular space 51*; and that the said Letters Patent should be read with this correction therein that the same may conform to the record of the case in the Patent Office.

Signed and sealed this 23rd day of July, A. D. 1946.

[SEAL]

LESLIE FRAZER,
*First Assistant Commissioner of Patents.*